(12) United States Patent
Wei et al.

(10) Patent No.: US 12,271,415 B2
(45) Date of Patent: Apr. 8, 2025

(54) METHOD, APPARATUS, DEVICE, READABLE STORAGE MEDIUM AND PRODUCT FOR MEDIA CONTENT PROCESSING

(71) Applicant: Beijing Zitiao Network Technology Co., Ltd., Beijing (CN)

(72) Inventors: Mingxin Wei, Beijing (CN); Shiman Shi, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/733,579

(22) Filed: Jun. 4, 2024

(65) Prior Publication Data

US 2024/0320256 A1    Sep. 26, 2024

Related U.S. Application Data

(63) Continuation of application No. 18/542,706, filed on Dec. 17, 2023, now Pat. No. 12,019,669, which is a
(Continued)

(30) Foreign Application Priority Data

Aug. 4, 2021  (CN) .......................... 202110892028.0

(51) Int. Cl.
*G06F 16/43* (2019.01)
(52) U.S. Cl.
CPC .................................... *G06F 16/43* (2019.01)
(58) Field of Classification Search
CPC ....................................................... G06F 16/43
See application file for complete search history.

(56) References Cited

U.S. PATENT DOCUMENTS

2002/0075250 A1* 6/2002 Shigeta .................. G09G 5/026
345/204
2004/0205131 A1* 10/2004 Saruhashi .......... H04N 7/17318
348/E7.071
(Continued)

FOREIGN PATENT DOCUMENTS

| CN | 104765761 A | 7/2015 |
| CN | 108289180 A | 7/2018 |

(Continued)

OTHER PUBLICATIONS

International Search Report (with English Translation) and Written Opinion issued PCT/CN2022/108697, dated Sep. 19, 2022; 8 pages.

(Continued)

*Primary Examiner* — Ajith Jacob
(74) *Attorney, Agent, or Firm* — BakerHostetler

(57) ABSTRACT

Embodiments of the present disclosure provides a method, apparatus, apparatus, readable storage medium and product for media content processing, the method comprising: displaying an interface for a conversation, members of the conversion including a first object and a second object; displaying a message of the second object on the interface for the conversation, wherein the message comprises a first source; obtaining a second source captured or selected by the first object and determining synthesis mode information, wherein the synthesis mode information is configured to be selected by the first object or predefined based on the first source; integrating the first source and the second source based on the synthesis mode information to obtain a target media content; and posting the target media content.

20 Claims, 5 Drawing Sheets

Related U.S. Application Data continuation of application No. PCT/CN2022/108697, filed on Jul. 28, 2022.

(56) References Cited

U.S. PATENT DOCUMENTS

| | | |
|---|---|---|
| 2015/0309673 A1 | 10/2015 | Brandley |
| 2017/0083534 A1 | 3/2017 | Strong et al. |
| 2019/0012320 A1 | 1/2019 | Liu |
| 2019/0287224 A1 | 9/2019 | Amirghodsi et al. |
| 2020/0183885 A1 | 6/2020 | Li et al. |
| 2023/0336684 A1 | 10/2023 | He et al. |

FOREIGN PATENT DOCUMENTS

| | | |
|---|---|---|
| CN | 109089059 A | 12/2018 |
| CN | 110796712 A | 2/2020 |
| CN | 110796715 A | 2/2020 |
| CN | 110992256 A | 4/2020 |
| CN | 111147766 A | 5/2020 |
| CN | 111163264 A | 5/2020 |
| CN | 111324349 A | 6/2020 |
| CN | 111429338 A | 7/2020 |
| CN | 111611941 A | 9/2020 |
| CN | 111901535 A | 11/2020 |
| CN | 112004034 A | 11/2020 |
| CN | 112770184 A | 5/2021 |
| CN | 113253885 A | 8/2021 |
| CN | 113806306 A | 12/2021 |
| CN | 113870133 A | 12/2021 |
| WO | WO 2018/096661 A1 | 5/2018 |

OTHER PUBLICATIONS

Office Action in corresponding Chinese Application No. 202110892028.0, dated Nov. 9, 2022; 13 pages.

Japan Patent Application No. 2023-578782; Reasons for Refusal; dated Sep. 17, 2024; 10 pages.

China Patent Application No. 202110892028.0; Notification to Grant; dated Dec. 15, 2023; 6 pages.

European Patent Application No. 22852032.6; Extended Search Report; dated Sep. 10, 2024; 8 pages.

Xiao Xiao; Analysis on the application of computer technology in the field of video editing; Management & Technology of SME; 5 pages (contains English Abstract).

"Introduction to LINE from the 50s Gentle explanation of LINE's trouble"; Mediax; Jan. 2021; p. 50-52 (contains English Abstract).

* cited by examiner

METHOD, APPARATUS, DEVICE, READABLE STORAGE MEDIUM AND PRODUCT FOR MEDIA CONTENT PROCESSING

CROSS REFERENCE

This application is a continuation of U.S. patent application Ser. No. 18/542,706, filed on Dec. 17, 2023, which is a continuation of International Patent Application No. PCT/CN/2022/108697, filed on Jul. 28, 2022, which claims priority to Chinese Patent Application No. 202110892028.0 filed on Aug. 4, 2021, and entitled "METHOD, APPARATUS, DEVICE, READABLE STORAGE MEDIUM AND PRODUCT FOR MEDIA CONTENT PROCESSING", all of which are incorporated herein by reference in their entireties.

FIELD

Embodiments of the present disclosure relate to the technical field of data processing, and in particular, to a method, apparatus, device, readable storage medium, and product for media content processing.

BACKGROUND

Video software has gradually entered their lives. Users can record their lives by capturing and posting videos on video software, and browse videos uploaded by other users on video software.

SUMMARY

The present disclosure provides a method, apparatus, device, readable storage medium, and product for media content processing to solve the technical problem that the existing media content production can only be created by a single user, and the implementation method is relatively single, which cannot meet the personalized needs of users.

In a first aspect, the present disclosure provides a media content processing method, comprising: receiving a source sent by a second user; in response to a media content rendering command triggered by a first user on a receiving interface of the source, providing a rendering source to the first user, wherein the rendering source is the source sent by the second user to the first user; obtaining a source to be integrated that is uploaded by the first user and determining synthesis mode information, the synthesis mode information selected by the first user or pre-selected based on the rendering source; performing an integration operation on the rendering source and the source to be integrated according to the synthesis mode information to obtain a target media content; and posting the target media content.

In a second aspect, the present disclosure provides an apparatus for information display, comprising: a receiving module configured to receive a source sent by a second user; a processing module configured to, in response to a media content rendering command triggered by a first user on a receiving interface of the source, provide a rendering source to the first user, wherein the rendering source is the source sent by the second user to the first user; an obtaining module configured to obtain a source to be integrated and determining synthesis mode information, the synthesis mode information selected by the first user or pre-selected based on the rendering source; a synthesis module configured to perform an integration operation on the rendering source and the source to be integrated according to the synthesis mode information to obtain a target media content; and a posting module configured to post the target media content.

In a third aspect, the present disclosure provides an electronic device comprising: a processor and a memory; the memory storing computer-executable instructions, the processor executing computer-executable instructions stored in the memory and caused to implement the method of media content processing of the first aspect and various possible designs thereof.

In the fourth aspect, the present disclosure provides a computer-readable storage medium storing computer-executable instructions. The computer-executable instructions, when executed by a processor, implement the method of the media content processing of the first aspect and various possible designs thereof.

In a fifth aspect, the present disclosure provides a computer program product, comprising a computer program that, when executed by a processor, implements the method of media content processing of the first aspect and various possible designs thereof.

In a sixth aspect, the present disclosure provides a computer program that, when executed by a processor, implements the method of media content processing of the first aspect and various possible designs thereof.

BRIEF DESCRIPTION OF THE DRAWINGS

In order to more clearly illustrate the technical solutions in the disclosed embodiments or Prior Art, a brief introduction will be made to the drawings required for the embodiments or Prior Art descriptions. Apparently, the drawings described below are some embodiments of the present disclosure. For those skilled in the art, other drawings can be obtained without creative labor based on these drawings.

DETAILED DESCRIPTION

In order to make the purpose, technical solutions, and advantages of the disclosed embodiments clearer, the technical solutions in the disclosed embodiments will be clearly and completely described below in conjunction with the accompanying drawings. Obviously, the described embodiments are part of the disclosed embodiments, not all of them. Based on the embodiments in the disclosed embodiments, all other embodiments obtained by those skilled in the art without creative labor are within the scope of protection of the disclosed embodiments.

In existing video applications, the production of media contents can only be created by a single user. This unimodal way sometimes cannot meet the personalized needs of users.

In view of the above technical problem, the present disclosure provides a method, apparatus, device, readable storage medium and product for media content processing.

It should be noted that the present disclosure provides a method, apparatus, device, readable storage medium, and product for media content processing that can be used in any scenario where both parties jointly produce media contents.

In known media content production process, it is generally implemented by a single user. Users can choose sources and special effects according to their actual needs to complete the production of media contents. However, the above media content production methods often have a relatively simple implementation method and low interest.

In order to solve the above technical problems, increase the fun of media content production, both users can support the production of media contents together. Specifically, the sources uploaded by two users and the synthesis mode information can be obtained separately. The sources uploaded by the two users are integrated according to the synthesis mode information to obtain the target media content.

Figure 1:
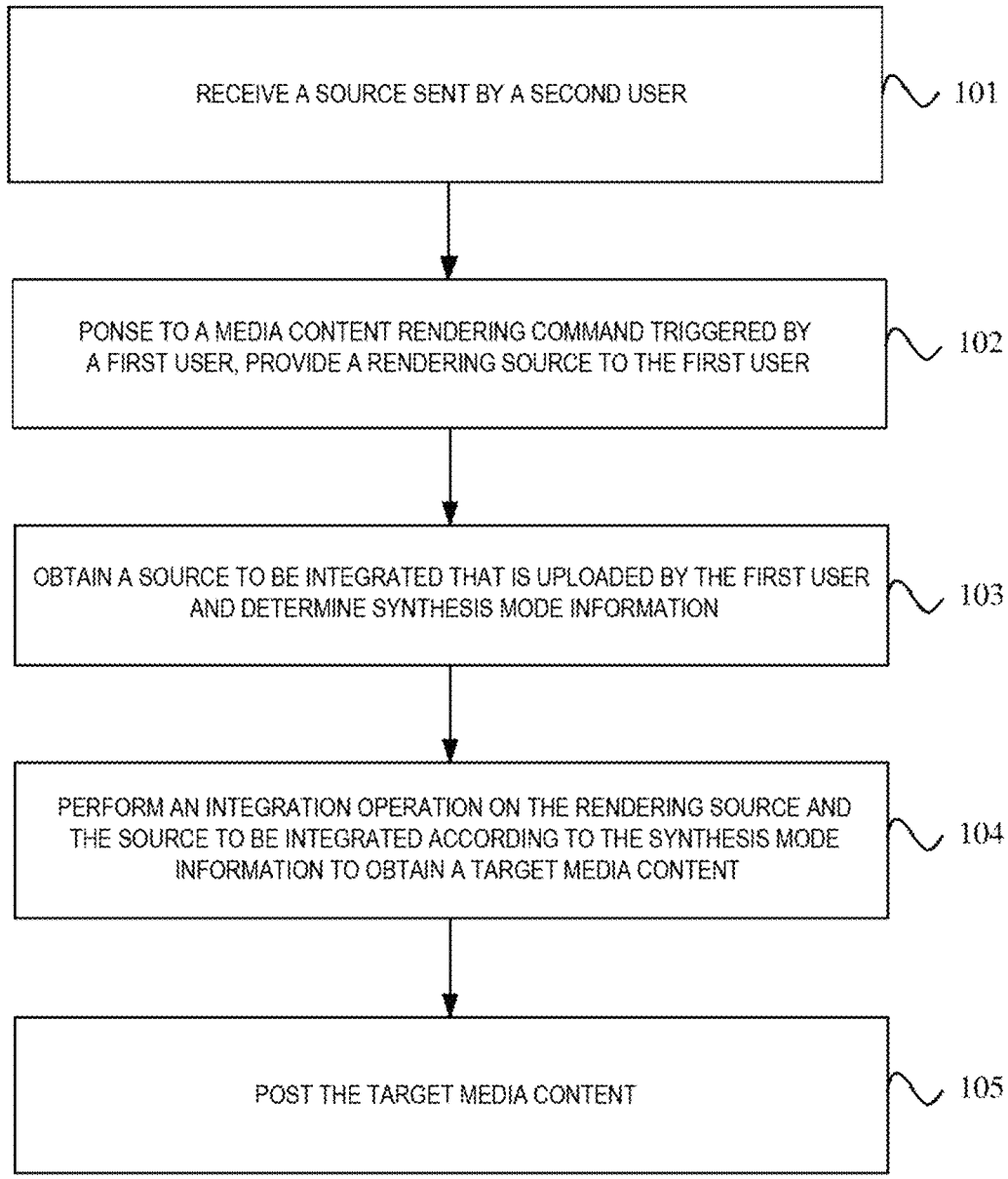
FIG. 1 is a flowchart of a method of media content processing provided in the present disclosure.

FIG. 1 is a flowchart of the media content processing method provided in the present embodiment, as shown in FIG. 1. The method comprises:

Step 101: receive a source sent by a second user.

The execution entity is a media content processing apparatus. The media content processing apparatus may be coupled to a terminal device, and a user may create a media content with the terminal device by means of human-machine interaction. Alternatively, the media content processing apparatus may also be coupled to a server, which may be communicatively connected to the terminal device, so that the media content can be created according to a request sent by the terminal device.

In this implementation, in order to improve the fun of media content production, both users can support the production of target media contents together. Specifically, the first user and the second user can respectively determine parts of the sources, and the target media content can be produced based on all the sources determined by the first and second users.

Correspondingly, the media content processing apparatus can receive sources sent by the second user. The second user can specifically be another real user, and the sources sent by the second user can be photos currently taken by the second user or pictures uploaded from a predetermined storage path. Alternatively, the second user can also be a virtual user, and the sources sent by the second user can be one or more of the predetermined multiple images.

As a possible implementation, in case that the second user is a virtual user, the source sent by the second user can be predetermined paintings authorized by the author, such as paintings completed by autistic children. Therefore, the first user can further create based on the paintings completed by autistic children to achieve the generation of target media contents.

Step 102: in response to a media content rendering command triggered by a first user on a receiving interface of the source, provide a rendering source to the first user, wherein the rendering source is the source sent by the second user to the first user.

In this embodiment, a rendering button can be provided on the receiving interface of the source sent by the second user, and the user can generate a media content rendering command by triggering the rendering button. As an example, in practice, a rendering button can be added to the source sent by the second user, and a predetermined text can be set around the rendering button such as "click on the blank space to complete his/her picture."

After obtaining the media content rendering command triggered by the first user, the rendering source can be provided to the first user. Specifically, the number of sources sent by the second user can be at least one, and the first user can select the rendering source according to actual needs. The first user can select the rendering source by sliding the screen left and right. The rendering source determined by the first user is used to be integrated with the source uploaded by the first user.

The rendering source is the source sent by the second user to the first user.

Step 103: obtain a source to be integrated that is uploaded by the first user, and determine the synthesis mode information, the synthesis mode information selected by the first user or predetermined based on the rendering source.

In this embodiment, after the second user sends the source, the first user can also upload the source to be integrated according to actual needs, where the source to be integrated can be a real-time photo taken by the first user or a source selected by the first user from a predetermined storage path. Correspondingly, the media content processing apparatus can obtain the source to be integrated that is uploaded by the first user and determine the synthesis mode information.

The synthesis mode information can be any one or more of the following: effect information, background music information, filter information, etc. The synthesis mode information can be selected by the first user or determined based on the rendering source. The rendering source can be associated with the synthesis mode information in advance.

Step 104, perform an integration operation on the rendering source and the source to be integrated according to the synthesis mode information to obtain a target media content.

In the present embodiment, after determining the synthesis mode information, rendering source and source to be integrated, an integration operation can be applied to the rendering source and source to be integrated according to the synthesis mode information, to obtain a target media content.

In practice, for example, the source to be integrated can be integrated into the blank area of the rendering source. The synthesis mode information may be background music and playback effects, and a video can be formed based on the background music and playback effects according to the synthesized image. The video is determined as the target media content.

Step 105, post the target media content.

In this implementation, after completing the production of the target media content based on the sources uploaded by the first and second users, the target media content can be posted. Optionally, the target media content can also be stored in a predetermined storage path. For example, the target media content can be posted to the current application according to the selection operation of the first user. It can be understood that the user can also send the target media content to a third-party platform, and this disclosure is not limited in this regard.

Figure 2:
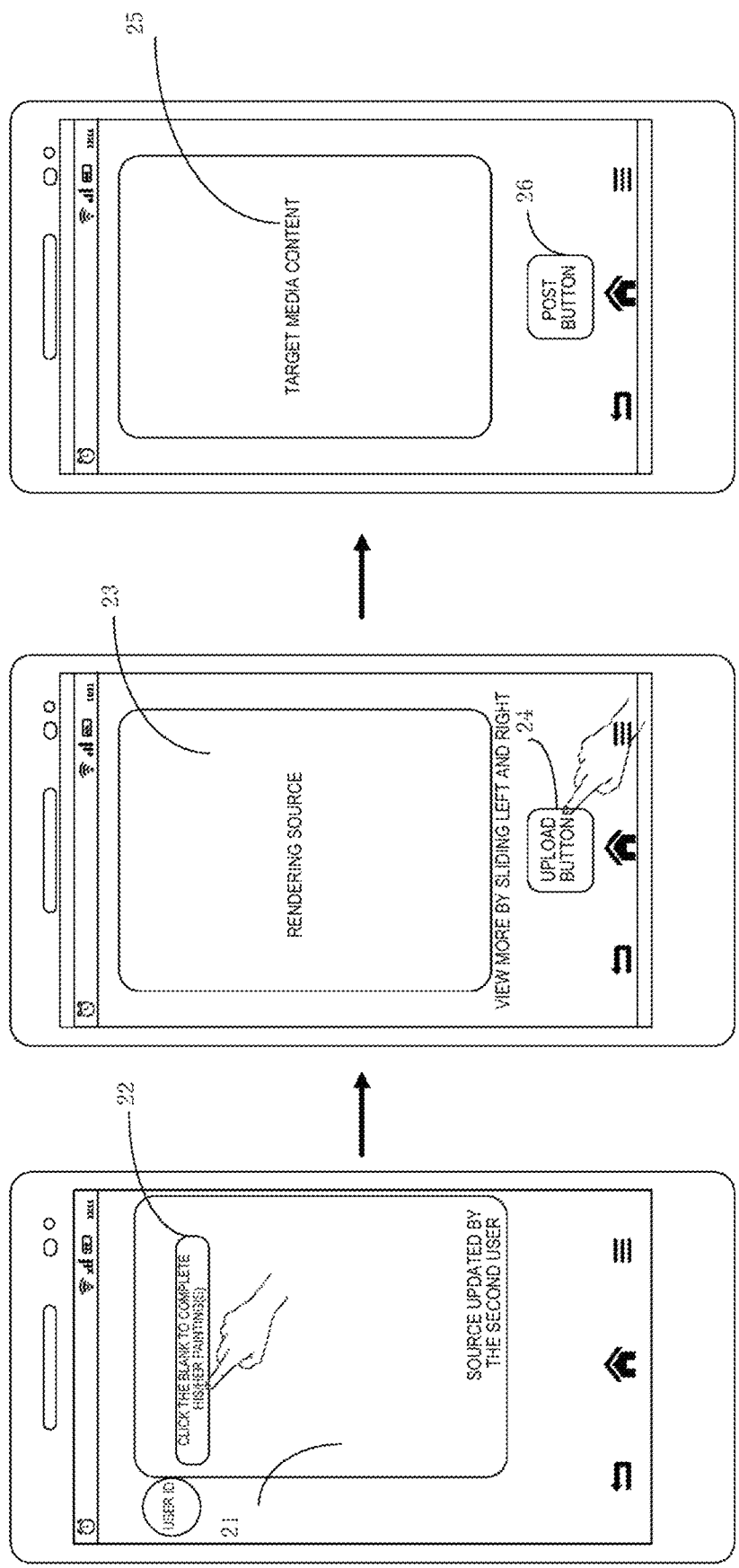
FIG. 2 is a schematic diagram of the interface interaction provided in the disclosed embodiment.

FIG. 2 is a schematic diagram of interface interaction provided by the disclosed embodiment. As shown in FIG. 2, the second user can send the source 21, and the first user can generate a media content rendering command by triggering a predetermined rendering button 22 and can display the rendering source 23 on the display interface according to a pattern rendering command. The first user can upload the source to be integrated by triggering a predetermined upload button 24 on the display interface. Upon completion of the upload of source to be integrated and the determination of the synthesis mode information, the rendering source and the source to be integrated can be integrated according to the synthesis mode information to obtain the target media content 25. The first user can post the target media content by triggering a predetermined posting button 26.

Furthermore, based on the above embodiments, step 103 specifically comprises:

In response to a capturing command triggered by the first user, calling a predetermined camera image capturing operation according to the capturing command, where the captured image obtained is determined as the source to be integrated; or In response to an image selection command triggered by the first user where the image selection command comprises an image storage path, obtaining a target image from the storage path according to the image selection command, and the target image is determined as the source to be integrated.

In this embodiment, the source to be integrated can be a real-time photo taken by the first user, or a source selected by the first user in a predetermined storage path. In case that the source to be integrated is a picture taken by the first user, in response to the capturing command triggered by the predetermined capturing button triggered by the first user, the predetermined camera can be called to perform an image capturing operation. The captured image is determined as a source to be integrated.

Alternatively, when the source to be integrated is a source selected by the first user from a predetermined storage path, in response to the image selection command triggered by a predetermined selection button triggered by the first user, a target image is selected from the image storage path included in the image selection command. The target image is determined as a source to be integrated.

Figure 3:
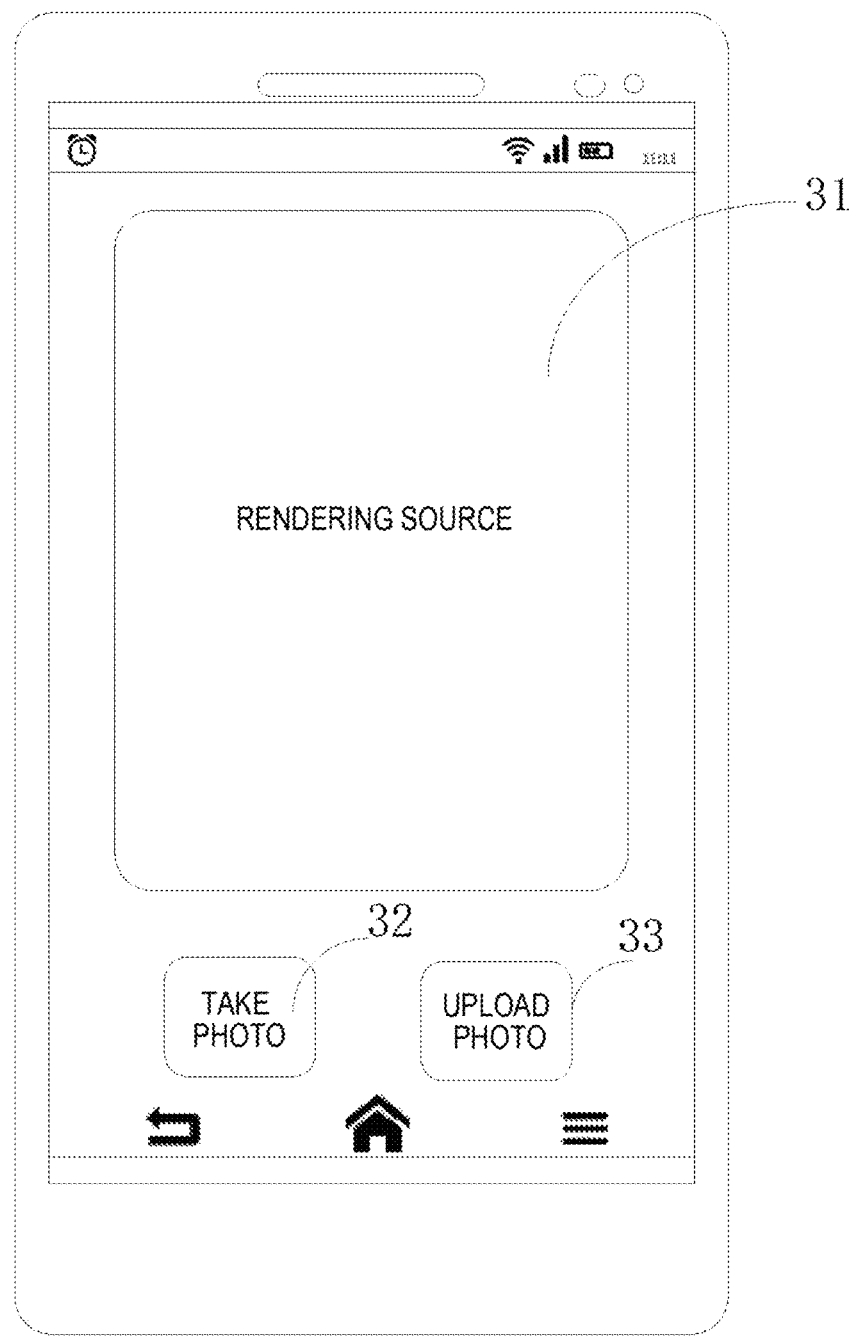
FIG. 3 is a schematic diagram of another display interface provided in this public embodiment.

FIG. 3 is a schematic diagram of another display interface provided in the present disclosure embodiment. As shown in FIG. 3, when the rendering source 31 is displayed on the display interface, the first user can upload the source to be integrated by triggering the upload button(s) preset on the display interface. The upload buttons include a "take photo" button 32 and a "upload photo" button 33. The user can generate a capturing command by triggering the "take photo" button 32. Alternatively, the user can generate an image selection command by triggering the "upload photo" button 33.

The method, apparatus, device, readable storage medium and product for media content processing as described herein first receive the source sent by the second user and provide rendering source to the first user in response to the media content rendering command triggered by the first user in the receiving interface. After obtaining the source to be integrated that is uploaded by the first user and determining the synthesis mode information, the rendering source and source to be integrated can be integrated according to the synthesis mode information to obtain the fused target media content. Therefore, the production of the target media content can be realized together based on the source determined by the first and second users, solving the problem that the existing media content processing method can only be generated by one party which brings low interest. Furthermore, it can meet the personalized needs of users and improve the fun of media content production.

Furthermore, based on the above embodiments, determining the synthesis mode information at step 103 comprises: performing an image recognition operation on the source to be integrated to determine a target action corresponding to the source to be integrated, wherein the image recognition operation comprises one or more of a facial recognition, a limb recognition, or a gesture recognition; and determining effect information corresponding to the target action as the synthesis mode information.

In the present embodiment, the synthesis mode information may be determined according to the source to be integrated. Specifically, a recognition operation may be performed on the source to be integrated to determine the target action corresponding to the source to be integrated. One or more of facial recognition, limb recognition or gesture recognition can be used to implement the integration operation of the source to be integrated, and the present disclosure is not limited in this regard.

According to the target action, the special effect information corresponding to the target action can be determined, and the effect information corresponding to the target action can be determined as composite mode information.

For example, it is possible to pre-configure the correspondence between the effect information and different expressions and/or actions and/or gestures and. After obtaining the source to be integrated, one or more of the expressions, actions, and gestures of the human body in the source to be integrated can be identified, and the effect information can be determined based on the recognition result and the predetermined correspondence, thereby determining the synthesis mode information.

By determining the synthesis mode information by recognition on the information to be integrated, the selection of the synthesis mode information can be automatically realized, and the selected synthesis mode information can be made more in line with the needs of the first user.

Optionally, based on any of the above embodiments, determining the synthesis mode information at step 103 comprises: in response to an effect selection command triggered by the first user, displaying all modes to be selected in a display interface; and determining a mode to be selected that is selected by the first user as the synthesis mode information.

In this embodiment, the synthesis mode information can also be selected by the first user according to actual needs. Specifically, the first user can select the current synthesis mode information to be used from a plurality of predetermined synthesis mode information according to actual needs. In response to the effect selection command triggered by the first user, all predetermined candidate modes can be displayed on the display interface to obtain the candidate mode selected by the user, and the candidate mode selected by the user can be used as the synthesis mode information.

By using the candidate mode selected by the first user according to actual needs as the synthesis mode information, the final use of the synthesis mode information can meet the actual needs of the user.

Furthermore, based on any of the above embodiments, after step 103, the method can further comprise: in response to a source adjustment command triggered by the first user, performing an adjustment operation on one or more of a size, a position or a color of the source to be integrated.

In the present embodiment, after the completion of upload of the source to be integrated, the source to be integrated can be displayed directly on the display interface, the first user can adjust the source to be integrated according to actual needs. Specifically, in response to the source adjustment command triggered by the first user, the adjustment operation can be applied to one or more of the size, position and color of the source to be integrated according to the source adjustment command.

For example, the source adjustment command can crop or adjust position of the source to be integrated, so that the display state of the source to be integrated better meet the user's personalized requirement.

Furthermore, based on any of the above embodiments, step 104 specifically comprises: if the source to be integrated is detected to contain a predetermined target source, performing an extraction operation on the target source in the source to be integrated; and performing an integration operation on the rendering source and the target source.

In the present embodiment, after obtaining the source to be integrated that is uploaded by the first user, further image processing can be applied to the source to be integrated to extract the target source from the source to be integrated. This target source can be integrated with the rendering source.

Specifically, it can be detected whether the source to be integrated includes a target source. For example, it is possible to detect whether the source to be integrated includes the face of the target object, predetermined content, etc. If it is detected that the source to be integrated includes the target source, the target source can be extracted. For example, the target source be obtained by cutout operations, cropping operations, etc. The target sources can be synthesized into rendering sources.

By extracting the target source from the source to be integrated, the synthesized image can include more effective content and improve the quality of the synthesized image.

Furthermore, based on any of the above embodiments, before step 102, the method may further comprise: interacting with the first user by displaying predetermined information on the display interface.

In this embodiment, in order to enable the first user to quickly understand the current implementation and rules, the display interface can be controlled to display predetermined information, so that the first user can understand the operation steps based on the predetermined information and complete the production and publication of the target media content.

Figure 4:
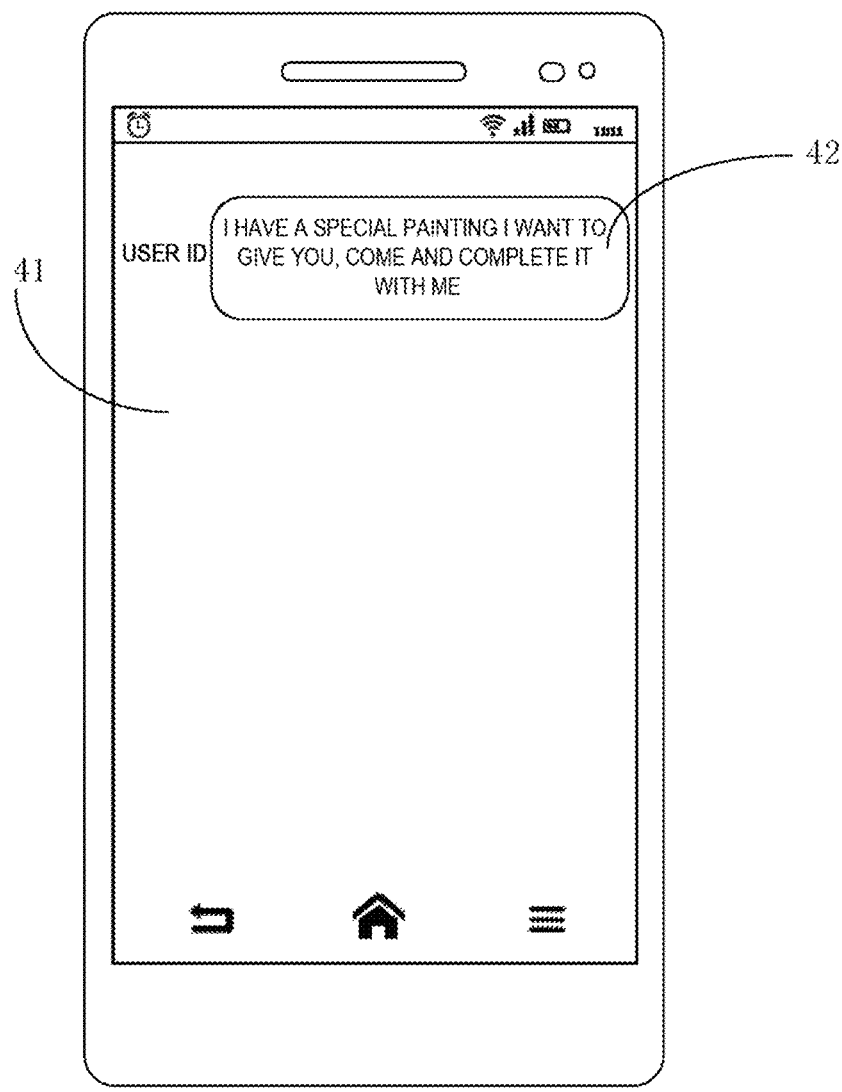
FIG. 4 is a schematic diagram of another interface interaction provided in the disclosed embodiment.

FIG. 4 is a schematic diagram of another interface interaction provided by the disclosed embodiment. As shown in FIG. 4, the display interface 41 enables interaction with the first user in a dialog manner. Specifically, predetermined information can be displayed in the dialog box 42. For example, the text "I have a special painting I want to give you, come and complete it with me" can be displayed, so that the user can click the predetermined button to enter the common rendering interface according to the instructions.

By controlling the display interface to display predetermined information, the efficiency of the first user target media content production can be improved.

Furthermore, based on any of the above embodiments, step 104 may specifically comprise: setting text information associated with the rendering source based on the synthesis mode information.

In this embodiment, after determining the synthesis mode information, the text information associated with the rendering source can be further set. The text information can be the name of the final target media content or the copywriting information set in the target media content.

Further, on the basis of any of the above embodiments, setting the text information associated with the rendering source based on the synthesis mode information may comprise: in response to a naming command triggered by the first user, randomly selecting and displaying a name from the predetermined naming template. Alternatively, setting text information associated with the rendering source based on the synthesis mode information may comprise: in response to a naming command triggered by the first user which comprises a user-defined name, determining the user-defined name as the name of the target media content.

In this embodiment, the text information can specifically be the name of the target media content. The name can be randomly determined by the first user from a plurality of predetermined naming templates. Specifically, in response to the naming command triggered by the first user, a name can be randomly selected and displayed in the naming template according to the naming command. The first user can determine whether to set the name as the text information associated with the rendering source according to actual needs. If the first user does not select the current name, another name can be randomly determined in the remaining un-displayed naming templates for display until the confirmation command triggered by the first user is received to obtain the text information associated with the rendering source.

Optionally, the name can also be a defined name by the first user. Specifically, in response to a naming command triggered by the first user, if the naming command includes a user-defined name, the user-defined name can be determined as the name of the target media content.

By setting text information for the target media content in a random or custom manner, the correlation between the text information and the target media content can be improved, and the quality of the target media content can be improved.

Figure 5:
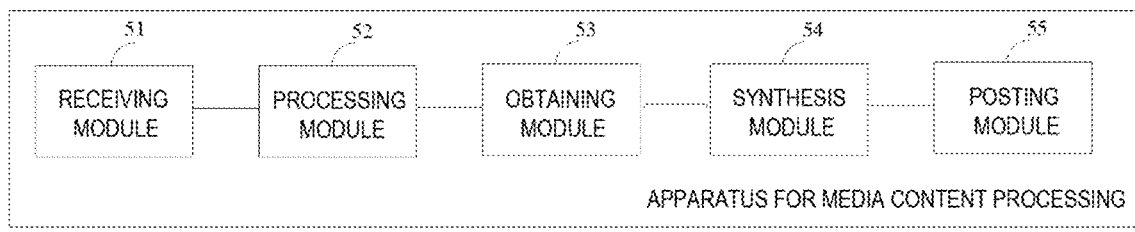
FIG. 5 is a schematic diagram of the structure of an apparatus for media content processing provided in the present embodiment.

FIG. 5 is a schematic diagram of the structure of an apparatus for media content processing provided in the embodiment of the present disclosure. As shown in FIG. 5, the apparatus for media content processing comprises: a receiving module 51, a processing module 52, an obtaining module 53, a synthesis module 54, and a posting module 55. The receiving module 51 is configured to receive a source sent by a second user. The processing module 52 is configured to, in response to a media content rendering command triggered by a first user on a receiving interface of the source, provide a rendering source to the first user, wherein the rendering source is the source sent by the second user to the first user. The obtaining module 53 is configured to obtain a source to be integrated and determining synthesis mode information, the synthesis mode information selected by the first user or pre-selected based on the rendering source. The synthesis module 54 is configured to perform an integration operation on the rendering source and the source to be integrated according to the synthesis mode information to obtain a target media content. The posting module 55 is configured to post the target media content.

Further, based on the above embodiment, the obtaining module is configured to: in response to a capturing command triggered by the first user, call a predetermined camera according to the capturing command to perform an image capturing operation, a captured image determined as the source to be integrated, or in response to an image selection commend triggered by the first user and comprising an image storage path, obtain a target image from the storage path according to the image selection command, the target image determined as the source to be integrated.

Further, on the basis of any of the above embodiments, the obtaining module is configured to: perform an image recognition operation on the source to be integrated to determine a target action corresponding to the source to be integrated, wherein the image recognition operation comprises one or more of a facial recognition, a limb recognition, or a gesture recognition; and determine effect information corresponding to the target action as the synthesis mode information.

Further, on the basis of any of the above embodiments, the obtaining module is configured to: in response to an effect selection command triggered by the first user, display all modes to be selected in a display interface; and determine a mode to be selected that is selected by the first user as the synthesis mode information.

Further, on the basis of any of the above embodiments, the apparatus further comprising an adjustment module configured to, in response to a source adjustment command triggered by the first user, perform an adjustment operation on one or more of a size, a position or a color of the source to be integrated.

Furthermore, based on any of the above embodiments, the second user is a virtual user.

Further, based on any of the above embodiments, the synthesis module is configured to, if the source to be integrated is detected to contain a predetermined target source, perform an extraction operation on the target source in the source to be integrated; and perform the integration operation on the rendering source and the target source.

Furthermore, based on any of the above embodiments, the apparatus further comprises an interaction module configured to perform an information interaction with the first user by displaying predetermined information on a display interface.

Further, based on any of the above embodiments, the synthesis module is configured to set text information associated with the rendering source according to the synthesis mode information.

Furthermore, based on any of the above embodiments, the synthesis module is configured to, in response to a naming command triggered by the first user, randomly select and display a name from a predetermined naming template; or, the synthesis module is configured to in response to a naming command triggered by the first user and comprising a user-defined name, determine the user-defined name as a name of the target media content.

Another embodiment of the present disclosure also provides a computer-readable storage medium, wherein the computer-readable storage medium stores computer-executable instructions, and when the processor executes the computer-executable instructions, the media content processing method as described in any of the above embodiments is implemented.

Another embodiment of the present disclosure also provides a computer program product comprising a computer program that, when executed by a processor, implements media content processing as described in any of the above embodiments.

Another embodiment of the present disclosure also provides a computer program that implements media content processing as described in any of the above embodiments when executed by a processor.

Another embodiment of the present disclosure also provides an electronic device comprising: a processor and a memory. The memory stores computer-executable instructions. The processor executes the computer-executable instructions stored in the memory, causing the processor to execute the media content processing method as described in any of the above embodiments.

In order to achieve the above embodiments, the present disclosure also provides an electronic device.

Figure 6:
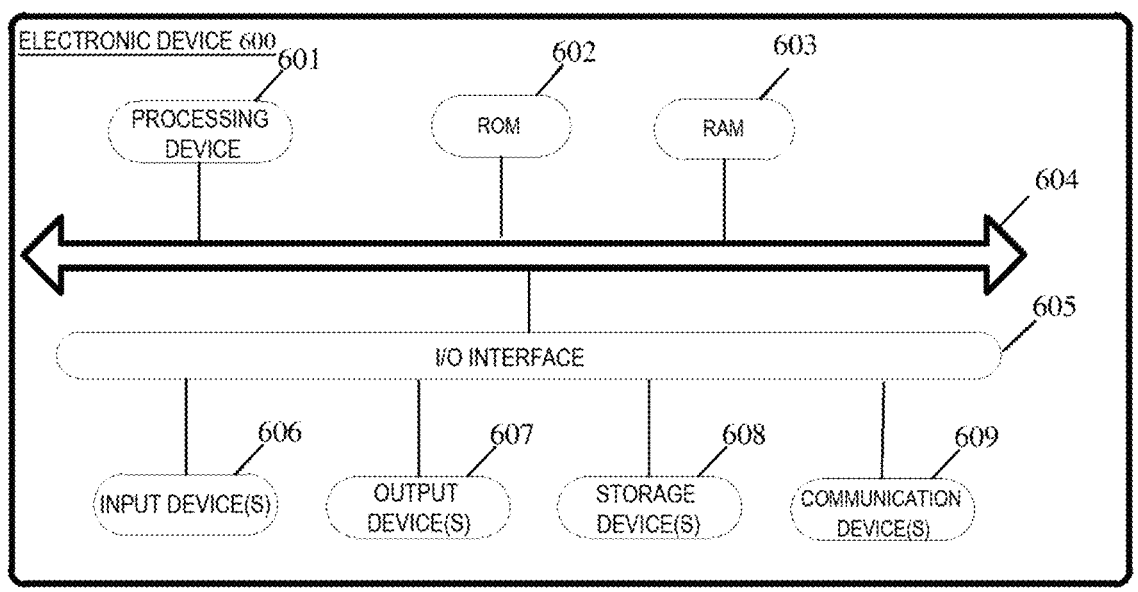
FIG. 6 is a schematic diagram of the structure of the electronic device provided in the present disclosure.

FIG. 6 is a schematic diagram of the structure of the electronic device provided in the embodiment of the present disclosure. As shown in FIG. 6, it shows a schematic diagram of the structure of the electronic device 600 suitable for implementing the embodiment of the present disclosure.

The electronic device 600 can be a terminal device or a server. The terminal devices can include but are not limited to mobile terminals such as mobile phones, laptops, digital broadcast receivers, personal digital assistants (PDAs), tablet computers (PADs), portable multimedia players (PMPs), car-mounted terminals (such as car navigation terminals), and fixed terminals such as digital TVs, desktop computers, etc. The electronic device shown in FIG. 6 is only an example and should not bring any restrictions on the functionality and scope of use of the present disclosure.

As shown in FIG. 6, electronic device 600 may include processing devices (such as Central Processor, graphics processing unit, etc.) 601, which can perform various appropriate actions and processes based on programs stored in Read Only Memory (ROM) 602 or programs loaded from storage device 608 into Random Access Memory (RAM) 603. In RAM 603, various programs and data required for the operation of electronic device 600 are also stored. Processing devices 601, ROM 602, and RAM 603 are connected to each other through bus 604. Input/output (I/O) interface 605 is also connected to bus 604.

Typically, the following devices can be connected to the I/O interface 605: input device(s) 606 including touch screens, touchpads, keyboards, mice, cameras, microphones, accelerometers, gyroscopes, etc.; output device(s) 607 including liquid crystal displays (LCDs), speakers, vibrators, etc.; storage device(s) 608 including magnetic tapes, hard disks, etc.; and communication devices 609. Communication device(s) 609 can allow electronic devices 600 to communicate wirelessly or wirelessly with other devices to exchange data. Although FIG. 6 shows an electronic device 600 with various devices, it should be understood that it is not required to implement or have all of the devices shown. More or fewer devices can be implemented or provided instead.

In particular, according to embodiments of the present disclosure, the process described above with reference to the flowchart can be implemented as a computer software program. For example, embodiments of the present disclosure include a computer program product that includes a computer program carried on a computer-readable medium, the computer program containing program code for performing the method shown in the flowchart. In such embodiments, the computer program can be downloaded and installed from the network through the communication device 609, or installed from the storage device 608, or installed from the ROM 602. When the computer program is executed by the processing device 601, the above functions defined in the method of the present disclosure embodiment are performed.

It should be noted that the computer-readable medium described above in this disclosure can be a computer-readable signal medium or a computer-readable storage medium or any combination thereof. The computer-readable storage medium can be, for example, but not limited to, an electrical, magnetic, optical, electromagnetic, infrared, or semiconductor system, device, or any combination thereof. More specific examples of computer-readable storage media can include but are not limited to: an electrical connection with one or more wires, a portable computer disk, a hard disk, random access memory (RAM), read-only memory (ROM), erasable programmable read-only memory (EPROM or flash memory), optical fibers, portable compact disk read-only memory (CD-ROM), optical storage devices, magnetic storage devices, or any suitable combination thereof. In this disclosure, a computer-readable storage medium can be any tangible medium containing or storing a program that can be used by or in conjunction with an instruction execution system, device, or device. In this disclosure, a computer-readable signal medium can include a data signal propagated in a baseband or as part of a carrier wave, which carries computer-readable program code. Such propagated data signals can take many forms, including but not limited to electromagnetic signals, optical signals, or any suitable combination thereof. Computer-readable signal media can also be any computer-readable medium other than computer-readable storage media, which can send, propagate, or transmit programs for use by or in conjunction with instruction execution systems, devices, or devices. The program code contained on the computer-readable medium can be transmitted using any suitable medium, including but not limited to: wires, optical cables, RF (radio frequency), etc., or any suitable combination thereof.

The computer-readable medium can be included in the electronic device, or it can exist alone without being assembled into the electronic device.

The computer-readable medium carries one or more programs that, when executed by the electronic device, cause the electronic device to perform the method shown in the above embodiments.

Computer program code for performing the operations of the present disclosure may be written in one or more programming languages, or combinations thereof, including Object Oriented programming languages such as Java, Smalltalk, C++, as well as conventional procedural programming languages such as "C" or similar programming languages. The program code may be executed entirely on the user's computer, partially on the user's computer, as a standalone software package, partially on the user's computer, partially on the remote computer, or entirely on the remote computer or server. In the case of a remote computer, the remote computer may be connected to the user's computer via any type of network, including a local area network (LAN) or a wide area network (WAN), or may be connected to an external computer (e.g., via the Internet using an Internet service provider).

The flowcharts and block diagrams in the accompanying drawings illustrate the architecture, functions, and operations of the system, method, and computer program product that may be implemented in accordance with various embodiments of the present disclosure. In this regard, each block in the flowcharts or block diagrams may represent a module, program segment, or portion of code that contains one or more executable instructions for implementing a specified logical function. It should also be noted that in some alternative implementations, the functions marked in the blocks may also occur in a different order than those marked in the drawings. For example, two consecutive blocks may actually be executed substantially in parallel, and they may sometimes be executed in the opposite order, depending on the function involved. It should also be noted that each block in the block diagrams and/or flowcharts, as well as combinations of blocks in the block diagrams and/or flowcharts, may be implemented using a dedicated hardware-based system that performs the specified function or operation, or may be implemented using a combination of dedicated hardware and computer instructions.

The units described in the disclosed embodiments may be implemented by means of software or by means of hardware, wherein the name of the unit does not constitute a limitation on the unit itself under certain circumstances, for example, the first acquisition unit may also be described as "a unit that acquires at least two internet protocol addresses."

The functions described above herein may be performed at least in part by one or more hardware logic components. For example, without limitation, exemplary types of hardware logic components that may be used include: field programmable gate arrays (FPGAs), application specific integrated circuits (ASICs), application specific standard products (ASSPs), system-on-chip (SOCs), complex programmable logic devices (CPLDs), and the like.

In the context of this disclosure, machine-readable media can be tangible media that can contain or store programs for use by or in conjunction with instruction execution systems, devices, or devices. Machine-readable media can be machine-readable signal media or machine-readable storage media. Machine-readable media can include, but are not limited to, electronic, magnetic, optical, electromagnetic, infrared, or semiconductor systems, devices, or devices, or any suitable combination thereof. More specific examples of machine-readable storage media may include electrical connections based on one or more wires, portable computer disks, hard disks, random access memory (RAM), read-only memory (ROM), erasable programmable read-only memory (EPROM or flash memory), optical fibers, convenient compact disk read-only memory (CD-ROM), optical storage devices, magnetic storage devices, or any suitable combination thereof.

In a first aspect, according to one or more embodiments of the present disclosure, a media content processing method is provided, comprising: receiving a source sent by a second user; in response to a media content rendering command triggered by a first user on a receiving interface of the source, providing a rendering source to the first user, wherein the rendering source is the source sent by the second user to the first user; obtaining a source to be integrated that is uploaded by the first user and determining synthesis mode information, the synthesis mode information selected by the first user or pre-selected based on the rendering source; performing an integration operation on the rendering source and the source to be integrated according to the synthesis mode information to obtain a target media content; and posting the target media content.

According to one or more embodiments of the present disclosure, the obtaining a source to be integrated that is uploaded by the first user comprises: in response to a capturing command triggered by the first user, calling a predetermined camera according to the capturing command to perform an image capturing operation, a captured image determined as the source to be integrated; or in response to an image selection commend triggered by the first user and comprising an image storage path, obtaining a target image from the storage path according to the image selection command, the target image determined as the source to be integrated.

According to one or more embodiments of the present disclosure, the determining synthesis mode information comprises: performing an image recognition operation on the source to be integrated to determine a target action corresponding to the source to be integrated, wherein the image recognition operation comprises one or more of a facial recognition, a limb recognition, or a gesture recognition; and determining effect information corresponding to the target action as the synthesis mode information.

According to one or more embodiments of the present disclosure, the determining synthesis mode information comprises: in response to an effect selection command triggered by the first user, displaying all modes to be selected in a display interface; and determining a mode to be selected that is selected by the first user as the synthesis mode information.

According to one or more embodiments of the present disclosure, after obtaining the source to be integrated that is uploaded by the first user, the method further comprises: in response to a source adjustment command triggered by the first user, performing an adjustment operation on one or more of a size, a position or a color of the source to be integrated.

According to one or more embodiments of the present disclosure, the second user is a virtual user.

According to one or more embodiments of the present disclosure, performing an integration operation on the rendering source and the source to be integrated comprises: if the source to be integrated is detected to contain a predetermined target source, performing an extraction operation on the target source in the source to be integrated; and performing the integration operation on the rendering source and the target source.

According to one or more embodiments of the present disclosure, before providing the rendering source to the first user, the method further comprises: performing an information interaction with the first user by displaying predetermined information on a display interface.

According to one or more embodiments of the present disclosure, the performing an integration operation on the rendering source and the source to be integrated according to the synthesis mode information to obtain a target media content comprises: setting text information associated with the rendering source according to the synthesis mode information.

According to one or more embodiments of the present disclosure, setting text information associated with the rendering source according to the synthesis mode information comprises: in response to a naming command triggered by the first user, randomly selecting and displaying a name from a predetermined naming template; or wherein setting text information associated with the rendering source according to the synthesis mode information comprises: in response to a naming command triggered by the first user and comprising a user-defined name, determining the user-defined name as a name of the target media content.

In a second aspect, according to one or more embodiments of the present disclosure, an apparatus for media content processing is provided, comprising: a receiving module configured to receive a source sent by a second user; a processing module configured to, in response to a media content rendering command triggered by a first user on a receiving interface of the source, provide a rendering source to the first user, wherein the rendering source is the source sent by the second user to the first user; an obtaining module configured to obtain a source to be integrated and determining synthesis mode information, the synthesis mode information selected by the first user or pre-selected based on the rendering source; a synthesis module configured to perform an integration operation on the rendering source and the source to be integrated according to the synthesis mode information to obtain a target media content; and a posting module configured to post the target media content.

According to one or more embodiments of the present disclosure, the obtaining module is configured to: in response to a capturing command triggered by the first user, call a predetermined camera according to the capturing command to perform an image capturing operation, a captured image determined as the source to be integrated, or in response to an image selection commend triggered by the first user and comprising an image storage path, obtain a target image from the storage path according to the image selection command, the target image determined as the source to be integrated.

According to one or more embodiments of the present disclosure, the obtaining module is configured to: perform an image recognition operation on the source to be integrated to determine a target action corresponding to the source to be integrated, wherein the image recognition operation comprises one or more of a facial recognition, a limb recognition, or a gesture recognition; and determine effect information corresponding to the target action as the synthesis mode information.

According to one or more embodiments of the present disclosure, the obtaining module is configured to: in response to an effect selection command triggered by the first user, display all modes to be selected in a display interface; and determine a mode to be selected that is selected by the first user as the synthesis mode information.

According to one or more embodiments of the present disclosure, the apparatus further comprising an adjustment module configured to, in response to a source adjustment command triggered by the first user, perform an adjustment operation on one or more of a size, a position or a color of the source to be integrated.

According to one or more embodiments of the present disclosure, the second user is a virtual user.

According to one or more embodiments of the present disclosure, the synthesis module is configured to, if the source to be integrated is detected to contain a predetermined target source, perform an extraction operation on the target source in the source to be integrated; and perform the integration operation on the rendering source and the target source.

According to one or more embodiments of the present disclosure, the apparatus further comprises an interaction module configured to perform an information interaction with the first user by displaying predetermined information on a display interface.

According to one or more embodiments of the present disclosure, the synthesis module is configured to set text information associated with the rendering source according to the synthesis mode information.

According to one or more embodiments of the present disclosure, the synthesis module is configured to, in response to a naming command triggered by the first user, randomly select and display a name from a predetermined naming template; or, the synthesis module is configured to in response to a naming command triggered by the first user and comprising a user-defined name, determine the user-defined name as a name of the target media content.

In a third aspect, according to one or more embodiments of the present disclosure, an electronic device is provided, comprising: at least one processor and memory. The memory stores computer-executable instructions. The at least one processor executes the computer-executable instructions stored in the memory, which causes the at least one processor to execute the media content processing method as described in the first aspect and various possible designs of the first aspect.

In a fourth aspect, according to one or more embodiments of the present disclosure, a computer-readable storage medium is provided, wherein the computer-readable storage medium stores computer-executable instructions, and when the processor executes the computer-executable instructions, the media content processing method described in the first aspect and various possible designs of the first aspect is implemented.

In a fifth aspect, according to one or more embodiments of the present disclosure, a computer program product is provided, comprising a computer program that, when executed by a processor, implements the media content processing method described in the first aspect and various possible designs of the first aspect.

In a sixth aspect, according to one or more embodiments of the present disclosure, a computer program is provided that implements the media content processing method described in the first aspect and various possible designs of the first aspect when executed by a processor.

The method, apparatus, device, readable storage medium and product for media content processing provided in this embodiment first receive the source sent by the second user and then provide rendering source to the first user in response to the media content rendering command triggered by the first user in the receiving interface. After obtaining the source to be integrated that is uploaded by the first user and determining the synthesis mode information, the rendering source and source to be integrated can be integrated according to the synthesis mode information to obtain the fused target media content. Therefore, the production of the target media content can be realized together based on the source determined by the first user and the second user, solving the problem that the existing media content processing method can only be generated by one party, which brings low interest. Furthermore, it can meet the personalized needs of users and improve the fun of media content production.

The above description is only the best embodiment of the present disclosure and an explanation of the technical principles used. Those skilled in the art should understand that the scope of the disclosure involved in this disclosure is not limited to technical solutions composed of specific combinations of the above technical features, but should also cover other technical solutions formed by arbitrary combinations of the above technical features or their equivalent features without departing from the above disclosure concept. For example, technical solutions formed by replacing the above features with (but not limited to) technical features with similar functions disclosed in this disclosure.

In addition, although various operations are depicted in a specific order, this should not be understood as requiring these operations to be performed in the specific order shown or in a sequential order. In certain environments, multitasking and parallel processing may be advantageous. Similarly, although several specific implementation details are included in the above discussion, these should not be construed as limiting the scope of the present disclosure. Certain features described in the context of individual embodiments can also be implemented in combination in a single embodiment. Conversely, various features described in the context of a single embodiment can also be implemented separately or in any suitable subcombination in multiple embodiments.

Although the subject matter has been described in language specific to structural features and/or methodological logical actions, it should be understood that the subject matter defined in the appended claims is not necessarily limited to the specific features or actions described above. On the contrary, the specific features and actions described above are merely exemplary forms of implementing the claims.

We claim:

1. A method of media content processing, comprising:

displaying an interface configured to enable a conversation between a first object and a second object;

displaying a message of the second object on the interface, wherein the message comprises a first resource;

obtaining a second resource captured or selected by the first object and determining synthesis mode information, wherein the synthesis mode information is configured to be determined by the first object or predefined based on the first resource;

triggering integration of the first resource and the second resource based on the synthesis mode information to obtain a target media content; and wherein the obtaining a second resource comprises:

in response to a capturing command, capturing a first media resource to obtain the second resource, or in response to a selection commend, obtaining a second media resource based on the selection command.

2. The method of claim 1, wherein the determining synthesis mode information comprises:

recognizing the second resource to determine a target action corresponding to the second resource, wherein the second resource is recognized based on one or more of a facial recognition, a limb recognition, or a gesture recognition; and determining effect information corresponding to the target action as the synthesis mode information.

3. The method of claim 1, wherein the determining synthesis mode information comprises:

in response to an effect selection command, displaying all modes to be selected on the interface; and determining a mode to be selected that is selected by the first object as the synthesis mode information.

4. The method of claim 1, wherein, after obtaining the second resource that is uploaded by the first object, the method further comprises:

in response to a resource adjustment command, adjusting one or more of a size, a position or a color of the second resource.

5. The method of claim 1, wherein the second object is a virtual object.

6. The method of claim 1, wherein the integrating the first resource and the second resource comprises:

if the second resource is detected to contain a predetermined target resource, extracting the target resource in the second resource; and integrating the first resource and the target resource.

7. The method of claim 5, further comprising:

displaying predetermined information on the interface for interacting with the first object.

8. The method of claim 1, wherein the integrating the first resource and the second resource according to the synthesis mode information to obtain a target media content comprises:

setting text information associated with the first resource according to the synthesis mode information.

9. The method of claim 8, wherein the setting text information associated with the first resource according to the synthesis mode information comprises:

in response to a naming command, randomly selecting and displaying a name from a predetermined naming template; or wherein setting text information associated with the first resource according to the synthesis mode information comprises:

in response to a naming command comprising an object-defined name, determining the object-defined name as a name of the target media content.

10. An electronic device comprising:

a processor and a memory;

the memory storing computer-executable instructions, the processor executing the computer-executable instructions stored in the memory, causing the processor to perform acts comprising:

displaying an interface configured to enable a conversation between a first object and a second object;

displaying a message of the second object on the interface, wherein the message comprises a first resource;

obtaining a second resource captured or selected by the first object and determining synthesis mode information, wherein the synthesis mode information is configured to be selected by the first object or predefined based on the first resource;

triggering integration of the first resource and the second resource based on the synthesis mode information to obtain a target media content; and wherein the obtaining a second resource comprises:

in response to a capturing command, capturing a first media resource to obtain the second resource, or in response to a selection commend, obtaining a second media resource based on the selection command.

11. The electronic device of claim 10, wherein the determining synthesis mode information comprises:

recognizing the second resource to determine a target action corresponding to the second resource, wherein the second resource is recognized based on one or more of a facial recognition, a limb recognition, or a gesture recognition; and determining effect information corresponding to the target action as the synthesis mode information.

12. The electronic device of claim 10, wherein the determining synthesis mode information comprises:

in response to an effect selection command, displaying all modes to be selected on the interface; and determining a mode to be selected that is selected by the first object as the synthesis mode information.

13. The electronic device of claim 10, wherein, after obtaining the second resource that is uploaded by the first object, the method further comprises:

in response to a resource adjustment command, adjusting one or more of a size, a position or a color of the second resource.

14. The electronic device of claim 10, wherein the second object is a virtual object.

15. The electronic device of claim 10, wherein the integrating the first resource and the second resource comprises:

if the second resource is detected to contain a predetermined target resource, extracting the target resource in the second resource; and integrating the first resource and the target resource.

16. The electronic device of claim 14, wherein the acts further comprise:

interacting with the first object by displaying predetermined information on the interface.

17. The electronic device of claim 10, wherein the integrating the first resource and the second resource according to the synthesis mode information to obtain a target media content comprises:

setting text information associated with the first resource according to the synthesis mode information.

18. A non-transitory computer-readable storage medium storing computer-executable instructions, the computer-executable instructions, when executed by a processor, performing acts comprising:

displaying an interface configured to enable a conversation between a first object and a second object;

displaying a message of the second object on the interface, wherein the message comprises a first resource;

obtaining a second resource captured or selected by the first object and determining synthesis mode information, wherein the synthesis mode information is configured to be selected by the first object or predefined based on the first resource;

triggering integration of the first resource and the second resource based on the synthesis mode information to obtain a target media content; and posting the target media content; and wherein the obtaining a second resource comprises:

in response to a capturing command, capturing a first media resource to obtain the second resource, or in response to a selection commend, obtaining a second media resource based on the selection command.

19. The method of claim 1, further comprising:

displaying or posting the target media content.

20. The electronic device of claim 10, the acts further comprising:

displaying or posting the target media content.

* * * * *